S. H. GARST.
CORN PLANTER.
APPLICATION FILED AUG. 19, 1911.
1,038,559.
Patented Sept. 17, 1912.
2 SHEETS—SHEET 1.
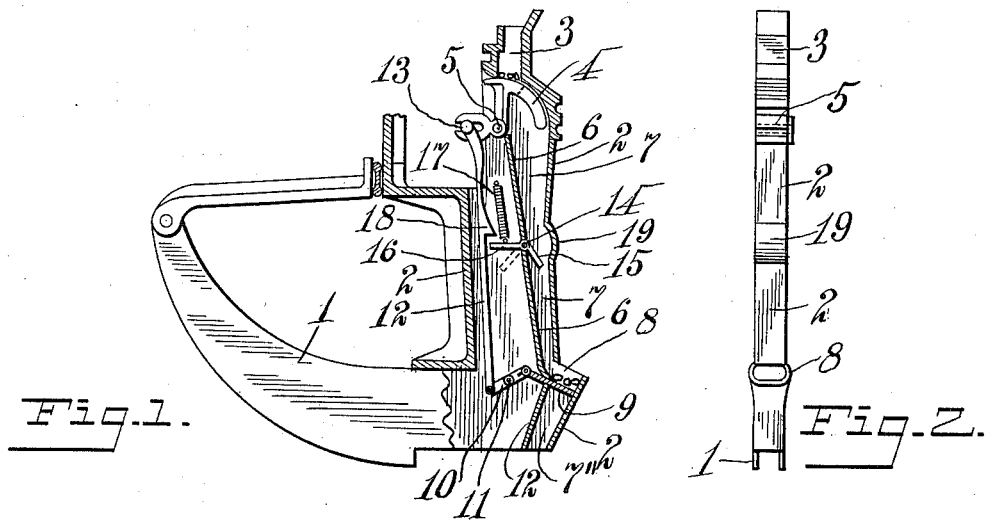
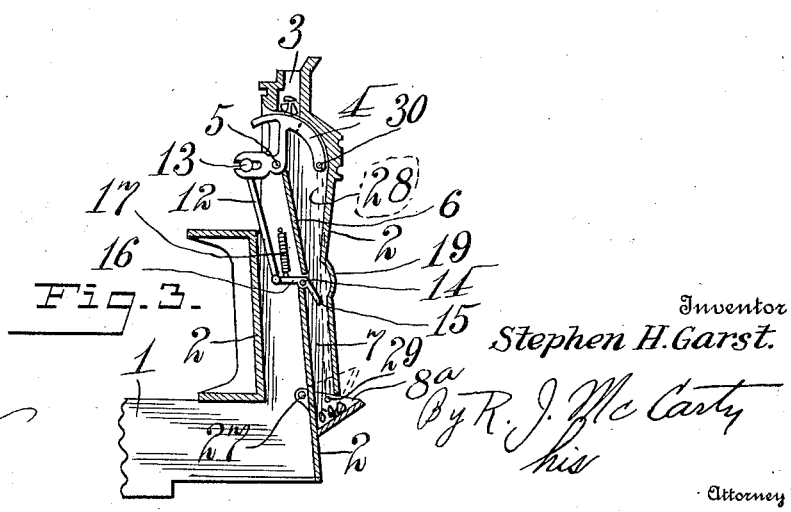
Inventor
Stephen H. Garst.
By R. J. McCarty
his Attorney
Witnesses S. H. GARST.
CORN PLANTER.
APPLICATION FILED AUG. 19, 1911.
1,038,559.
Patented Sept. 17, 1912.
2 SHEETS—SHEET 2.
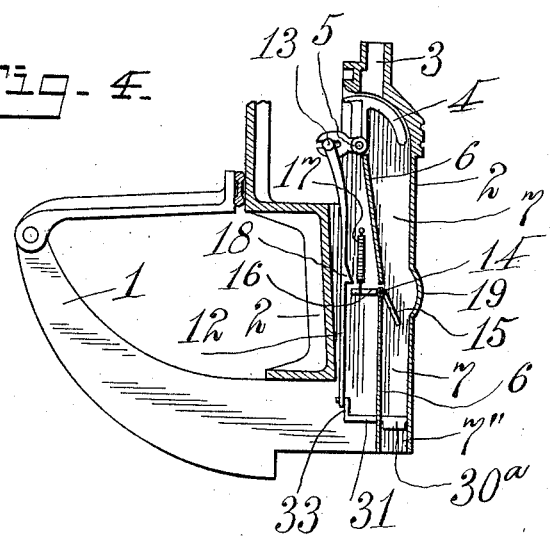
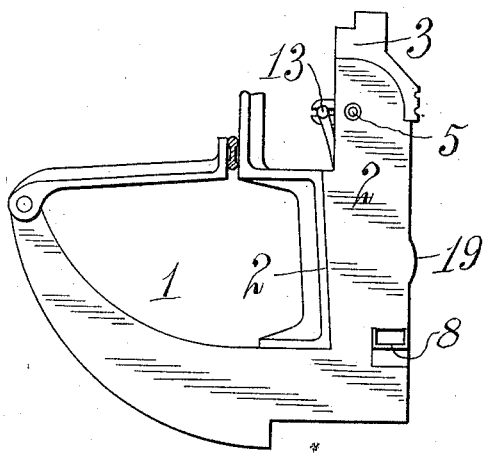
Witnesses
M. Siebler
H. S. Smith
Inventor
Stephen H. Garst.
R. J. McCarty
By his
Attorney

UNITED STATES PATENT OFFICE.

STEPHEN H. GARST, OF MOLINE, ILLINOIS.

CORN-PLANTER.

1,038,559.  Specification of Letters Patent.  Patented Sept. 17, 1912.

Application filed August 19, 1911. Serial No. 644,928.

*To all whom it may concern:*

Be it known that I, STEPHEN H. GARST, a citizen of the United States, residing at Moline, in the county of Rock Island and State of Illinois, have invented certain new and useful Improvements in Corn - Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in corn planters, and more particularly to the grain-dropping devices.

The object of the said improvements is to provide a shallow bell-shaped cup or bowl near the lower part of the corn planter shank or standard into which the corn or grain is discharged before it is dropped into the furrow. This shallow bowl is on the rear or side of the shank or standard, preferably the lower end, and is out of line with the channel through which the grains of corn travel and in full view of the driver. Being shallow, the operator of the planter can see each "hill" or "charge" as it is deposited into the cup and as it is deposited into the ground.

The mechanism of corn planters which select or separate the "hill" or "charge" from the hopper is liable to and often does get out of an operative condition. This results in dropping too much or too little grain, and possibly none at all. Other causes are likewise liable to interfere with a proper dropping of the grain, such for example as the clogging up of the rear end of the runner when the soil is wet, and when backing the planter with the runners in the ground. Under such conditions the corn will accumulate in the shank without being observed and until the accumulations interfere with the working of the internal valves.

It is therefore another object of this invention to provide means whereby the operator is enabled to see each discharge of grain as it enters the cup and thence to the furrow. This enables the operator to know that each hill receives its proper deposit of corn and to know that the planter is working properly. To this end the grain receptacle at the bottom of the channel is shallow and stands out conspicuously from the channel through which the grains pass.

Referring to the drawings, Figure 1 is a vertical longitudinal sectional elevation of a corn planter shank or standard having my improvements applied. Fig. 2 is an end elevation of the same. Fig. 3 is a view similar to Fig. 1, showing a modification of the shallow grain receptacle which extends outwardly from the grain channel. Fig. 4 is a view similar to Fig. 1, showing a modified construction in which the grain pocket is on the side of the shank and extends outwardly from the plane of the grain channel. Fig. 5 is a side elevation of the same and Fig. 6 is a rear elevation of the same, partially in section.

In the drawings and specification, similar reference characters indicate corresponding parts.

Referring particularly to Fig. 1 of the drawings, the runner 1 is the usual form of corn planter runner attached to the shank or standard 2. The upper end of said standard is provided with a pocket 3 which is mounted below the hopper. The hopper delivers initially to this pocket. As the hopper constitutes no part of the present invention, it has been deemed unnecessary to illustrate it, and the same is true of the devices which control the passage of the grain from the hopper to the initial pocket 3. These are well known by those familiar with corn planters and require no illustration or detailed description. The grain is normally held in the pocket 3 by a valve 4 which forms the bottom of said pocket. The said valve moves upon a pivot 5 when intermittently actuated from a check row wire or any other well known form of actuator. On the interior of the standard 2 a partition plate 6 is placed which forms a chute 7 through which the grain descends. At the bottom of the standard and on the rear side thereof, is a pocket 8 which extends rearwardly out of the plane of the chute 7 which leads to said pocket. The bottom 9 of this pocket slides in and out, and supports the grain or delivers said grain to the lower chute 7, and the pocket may be considered a continuation of chute 7. The pocket 8, as before stated, extends out from the line of the shank or standard, and the same may be covered with any suitable transparent material such as glass and the contents of the said pocket be visible to the driver or operator of the planter. The valve or slidable bottom 9 lies upon an incline as shown, and is connected to a lever 10 pivoted within the standard at 11 and connected with a connecting rod 12 forward of said pivot. The upper end of the rod 12 is connected to the upper valve 4 by a wrist pin and slotted crank connection 13. When the said valve 4 is opened to discharge the grain from the pocket 3, the lower valve or slidable bottom 9 is similarly moved to discharge the grain from the pocket 8. If for any reason the valve or bottom 9 should not close during the delivery of the grain through the upper portion of the chute 7, an intermediate valve 15 is provided which is adapted to be moved across the chute 7. This intermediate valve 15 is pivoted at 14 in an opening in the partition 6. An arm 16 extends forwardly therefrom and is controlled by a spring 17 which normally holds the intermediate valve 15 open. The connecting rod 12 has a shoulder 18 formed thereon which is adapted to engage the arm 16 when said rod is lowered to open the bottom of the pockets 3 and 8. Such engagement with the arm 16 closes the valve 15 so that when the pockets 3 and 8 are opened, entrance to the pocket 8 through the chute 7 is closed. And when the pockets 3 and 8 are closed, the intermediate valve 15 is open. The portion of the standard opposite the valve 15 is extended rearwardly and radially with the pivot 14, to coöperate with said valve in closing the entrance to pocket 8 when the bottom of the latter pocket is open. This extended part 19 will receive the grain when the said valve intercepts the passage of the grain to the lower pocket, thus holding the grain until the bottom 9 of said pocket is closed after each delivery of grain to the soil.

The construction shown in Fig. 3 is substantially the same as that shown in Fig. 1, with the exception that the pocket 8ª is movable. The said pocket is pivoted at 27 to the standard, and is moved to the dotted position to permit the grain to fall therefrom to the ground. Such movement is imparted by a rod 28 shown in broken lines, and connected to one side of the pocket at 29. This rod 28 also connects with the upper valve 4 at 30. In a corn planter provided with the rearwardly extended grain pocket from which the contents may be readily observed, accurate planting may be done and a full return realized from the labor expended.

In the construction shown in Figs. 4, 5 and 6, the upper and intermediate valves 4 and 15 are identical with the valves shown in Fig. 1. The lower valve 30ª is mounted on a rock shaft 31, which lies parallel with the sides of the standard. This permits the pocket 8 to be placed on the side of the standard. The valve 30ª is preferably placed on an angle, which directs the grain into the pocket where it will be in a position to be easily observed by the operator. The valve 30 is actuated from the connecting rod 12 by a crank 33 attached to the rock shaft 31.

Without limiting myself to the precise construction shown and described, which may be varied more or less without departing from the spirit of my invention, I claim:

1. In a corn planter, a standard through which grain is dropped in planting, valves in said standard controlling the passage of the grain, and a shallow pocket at the base of said standard and receiving the grain therefrom to be deposited in the furrow, said pocket being out of alinement with the passage through the standard so that the contents thereof may be visible from above said pocket, substantially as described.

2. In a corn planter, a standard through which the grain is dropped, valve mechanism at the entrance and intermediate portion of said standard controlling the passage of grain therethrough, and a shallow grain pocket at the base of said standard out of alinement with the passage through the standard, a valve in said pocket, the interior of said pocket and the valve in said pocket being visible from above said pocket, whereby the grain passing to and from said pocket may be seen, and means for concurrently opening or closing the valve at the entrance of the standard and in the pocket at the base thereof, and for closing the valve at the intermediate portion of said standard when said upper and lower valves are open, substantially as described.

In testimony whereof I affix my signature, in presence of two witnesses.

STEPHEN H. GARST.

Witnesses:
 SHERMAN C. HARTSOCK,
 HUBERT BURGIS.

---

Copies of this patent may be obtained for five cents each, by addressing the "Commissioner of Patents, Washington, D. C."